3,079,435
CATALYTIC HYDROGENATION OF
NITROPHENOL
Morris Freifelder and Ralph M. Robinson, Waukegan, Ill., assignors to Abbott Laboratories, North Chicago, Ill., a corporation of Illinois
No Drawing. Filed Mar. 30, 1961, Ser. No. 99,361
14 Claims. (Cl. 260—562)

The present application relates to a process of hydrogenating nitrophenol. More particularly, it relates to the hydrogenation of nitrophenol in a low-pressure reaction producing high yields.

The hydrogenation of aromatic nitro groups to the corresponding amino groups can be done electrolytically, chemically or catalytically. The electrolytic hydrogenation is highly uneconomical. The chemical reduction of the nitro group with a metal and a mineral acid is disadvantageous due to the difficulty in working up the reaction mixture. The various catalytical hydrogenations known in the literature are all deficient in that they either use high pressures, impractical solvents, or operate at uneconomical concentrations or reaction rates. The specific methods of the literature for hydrogenating a nitrophenol are deficient for the same reasons and also because any solvent heretofore suggested is unsuited for economical operation of the process, e.g. if water is used as the solvent for the catalytic reduction, only low concentrations of nitrophenol can be used due to the low solubility of the resulting aminophenol therein and the difficulty caused thereby for separating end product and catalyst.

It is therefore an object of the present invention to provide a new and improved process to hydrogenate nitrophenols. Another object of the present invention is the catalytic hydrogenation of nitrophenols in high yields at economical reaction speeds. A further object of the present invention is the direct conversion of nitrophenols to aminophenols of a quality acceptable for pharmaceutical use. A still further object of the present invention is the catalytic hydrogenation of nitrophenols at low pressure to aminophenols. It is an additional object of the present invention to provide a process for making acetylaminophenols from the corresponding nitrophenols without requiring the isolation or separation of the intermediate aminophenols. Another object is the conversion of nitrophenols into aminophenols at high nitrophenol concentrations.

These and other objects are accomplished by hydrogenating nitrophenol with gaseous hydrogen in the presence of palladium, platinum, or the corresponding oxides, at least one molar equivalent of acetic acid or an inert mineral acid and water, said hydrogenation mixture containing at least 10% of nitrophenol. Such a hydrogenation proceeds readily at room temperature and at low partial hydrogen pressures, e.g. below 100 p.s.i.g. Higher pressures may be used but no advantage is seen for batch-wise reactions to increase this pressure to such an extent that standard low-pressure equipment can no longer be used. It is also to be understood that higher temperatures than room temperature may be used, and may at times be desirable, but at room temperature economical conversion rates are obtained which will increase slightly at somewhat higher temperatures.

In one embodiment, the process of the present invention is characterized by mixing one mole of nitrophenol, an excess over one mole of acetic acid, 0.01% to 2% based on nitrophenol of catalytic platinum or palladium, and water to have a resulting concentration of between 10% and 40% nitrophenol in said mixture, and hydrogenating this mixture at a hydrogen pressure between above atmospheric pressure and about 100 p.s.i. The exothermic reaction is completed in 2–3 hours whereupon the catalyst is filtered off. The free aminophenol crystallizes upon neutralization of the filtrate or is isolated as a salt by evaporating the solution to dryness.

In another embodiment of the present invention an excess of acetic anhydride is added to the filtered reaction mixture of the hydrogenation reaction, whereupon pure acetylaminophenol crystallizes.

To better illustrate the foregoing general procedure, reference is made to the following examples which are added as illustrations only and are not meant to limit the invention in any respect except as indicated in the appended claims. In these examples, as well as in the appended discussions, percentages of nitrophenol in the reaction mixture are based on weight.

*Example 1*

(a) A mixture of 13.9 g. of p-nitrophenol, 40 cc. of water, 10 cc. of concentrated hydrochloric acid (1.1 molar equivalents), and 0.5 g. of 5% palladium on carbon is placed in a 500 cc. Parr shaker and hydrogenated at a maximum hydrogen pressure of 30 p.s.i.g. The hydrogenation of this mixture containing 19.2% of nitrophenol is complete in about 90 minutes. The mixture is filtered and the residual catalyst is washed with a little water. Wash liquor and filtrate are combined and evaporated to dryness under reduced pressure. The dried, white crystals are washed with ether and identified as p-aminophenol hydrochloride, melting at 305°. A yield of 85.9% of theory is obtained.

(b) In a modification of the above procedure, 2.6 cc. (one molar equivalent) of concentrated sulfuric acid is used instead of the hydrochloric acid. The reaction mixture contains 23.4% nitrophenol. The formed p-aminophenol sulfate is less soluble than the above p-aminophenol hydrochloride and water is added to the reaction mixture after completion of the hydrogenation to keep the salt in solution. The catalyst is filtered off and the filtrate is neutralized with ammonium hydroxide to a pH of 6, whereupon 9.15 g. (or 83.9% of theory) of pure, white p-aminophenol crystallizes. Without recrystallization it shows a melting point of 188° C.

*Example 2*

A mixture of 13.9 g. of p-nitrophenol, 45 cc. of water, 5.6 cc. of concentrated sulfuric acid, and 0.5 g. of 5% palladium on carbon is hydrogenated in a Parr shaker under the conditions of Example 1. The mixture contains 19.9% nitrophenol. After the hydrogen uptake is complete, sufficient water is added to keep the p-aminophenol sulfate salt in solution. The suspension is filtered and neutralized with ammonium hydroxide to a pH of 6.0 whereupon a precipitate forms. Instead of isolating this precipitate, 10.2 g. of acetic anhydride is added. The precipitated p-aminophenol dissolves and shortly thereafter, a crystalline precipitate of p-acetylaminophenol is formed. The mixture is cooled in an ice bath, filtered, and washed with water to produce a yield of 12.1 g. or 80.0% of pure, white p-acetylaminophenol melting at 168.5°–169.5° C.

*Example 3*

A mixture of 13.9 g. of p-nitrophenol, 40 cc. of water, and 10 cc. (1.75 molar equivalents) of acetic acid are mixed with 0.5 g. of 5% palladium on charcoal in a Parr shaker. The mixture containing 21.5% nitrophenol, is hydrogenated at room temperature with a maximum hydrogen pressure of 30 p.s.i.g. while shaking the vessel. After two hours, hydrogen uptake is complete and the catalyst is filtered off. To the filtrate, 10.2 cc. of acetic anhydride is added and the solution is allowed to stand. Pure, white p-acetylaminophenol crystallizes in an amount of 11.6 g. representing a 76.8% yield. On infrared examination, this product is found to be a single component void of any impurities. An assay indicates a concentration of 99.3% p-acetylaminophenol.

Upon neutralization of the mother-liquid with sodium bicarbonate and standing over night, an added 1.95 g. of pure, white p-acetylaminophenol is obtained, raising the total yield to 89.7%. In a modification of the above example, only 6.0 cc. of acetic acid is used. After hydrogenation, however, it is necessary to add additional acid to keep all product in solution for filtration of the catalyst. p-Acetylaminophenol on addition of acetic anhydride is obtained unchanged from the above example in quality and quantity.

Example 4

A mixture of 13.9 g. of p-nitrophenol, 0.5 g. of activated carbon (Nuchar C–190 N), 0.25 g. of Hy-Flo (a filter aid marketed by the Johns-Manville Corp.), 0.25 g. of 5% palladium on carbon, 10 cc. (1.75 molar equivalents) of glacial acetic acid, and 40 cc. of water, is hydrogenated in a Parr shaker at a hydrogen pressure between 58 and 38 p.s.i.g. The hydrogenation proceeds while the reaction mixture, containing 21.2% nitrophenol, warms up to a maximum temperature of 44.5° C. After 2 hours and 25 minutes, the reaction is completed and the insoluble materials are filtered off. The clear filtrate is treated with 10 cc. of acetic anhydride, whereupon acetylaminophenol crystallizes from the solution in a yield of 63.7% as a pure, white material.

The filtrate of the above crystallization is used as the solvent for another 20.9 g. of p-nitrophenol. This solution, containing about 26% nitrophenol, is hydrogenated in the presence of 0.25 g. of Hy-Flo, 0.5 g. of activated carbon, and the catalyst removed by filtration from the first run. The hydrogenation is completed in 3 hours and 20 minutes with a maximum temperature of 42.5° C. at a partial hydrogen pressure between 58 to 27.5 p.s.i.g. Again the insoluble materials are filtered off and 15 cc. of acetic anhydride is added to the clear filtrate to produce 18.34 g. of pure, white crystals of p-acetylaminophenol which corresponds to a yield of 81% of theory.

The filtrate is used in the same manner as above, together with additional carbon, filter aid, and new starting material for a third hydrogenation reaction with the catalyst filtered off from the above run. A crop of 84.6% pure p-acetylaminophenol is obtained. In further repetitions of this reaction, the procedure outlined is repeated, and produces a 77.0% yield in the fourth hydrogenation, an 82.5% yield in the fifth hydrogenation and an 85.5% yield of pure, white, crystalline p-acetylaminophenol in the sixth hydrogenation. At this point, the filtrate is clear and the catalyst can still be reused for a number of additional hydrogenation reactions. However, to determine the amount of p-acetylaminophenol remaining dissolved in this filtrate, this filtrate is neutralized with sodium bicarbonate and filtered, yielding another 4.8 g. of p-acetylaminophenol which, when combined with the above materials, produces an over-all yield of 82.2% of the theoretical amount based on the total amount of starting material.

Example 5

This example is added only to show the deficiency of an older process to make p-aminophenol and lies clearly outside the scope of the present invention.

A mixture of 6.9 g. of p-nitrophenol, 0.25 g. of 5% palladium on carbon, and 100 cc. of water, is hydrogenated with a hydrogen pressure between 58 and 47 p.s.i.g. The hydrogenation of this mixture containing 6.4% nitrophenol proceeds with a maximum temperature of 33° C. within 25 minutes, but heating of the reaction mixture to 79° C. is necessary to dissolve all the formed p-aminophenol before the catalyst can be filtered off. This heating is necessary in spite of the low concentration of starting material. From the filtrate, obtained by filtering the reaction solution hot, 2.0 g. of p-aminophenol crystallizes as a light brown solid at a yield of 37% of theory. The filtrate is a brown solution which cannot be reused for further hydrogenations without purification.

Example 6

A mixture of 20.9 g. of p-nitrophenol, 40 cc. of water, 15 cc. of glacial acetic acid, 0.25 g. of activated carbon, 0.25 g. of Hy-Flo, and 0.25 g. of 5% palladium on carbon, is hydrogenated in a Parr flask at a hydrogen pressure between 58 and 32 p.s.i.g., reaching a maximum temperature of 41° C. The concentration of nitrophenol in the mixture is 27%. After 3 hours and 8 minutes, the theoretical amount of hydrogen is absorbed. The catalyst is filtered off and the filtrate is concentrated in vacuum to a thick paste, to which 25 cc. of water, and 0.1 g. of sodium hydrosulfite is added. The resulting solution is neutralized with an aqueous sodium bicarbonate solution and the resulting clear liquid is cooled. p-Aminophenol crystallizes from this solution in an amount of 14.46 g., representing 88.2% of theory.

In a repetition of the above hydrogenation at hydrogen pressures varying between 58.2 and 35.2 p.s.i.g. a maximum temperature of 39.5° is reached and the theoretical hydrogen is taken up in 2 hours and 47 minutes. After filtration of the catalyst, the pH is brought to 8.3 with ammonium hydroxide after which 0.1 g. of sodium hydrosulfite is added. The resulting mixture is filtered and the residue, representing 13.27 g. (81.9% of theory) of p-aminophenol is dried.

Example 7

A mixture of 13.9 g. of p-nitrophenol, 40 cc. of deionized water, 10 cc. of glacial acetic acid and 1.0 g. of 1% platinum on carbon, is hydrogenated in a Parr flask. The nitrophenol concentration of the mixture is 21.2%. Absorption of the theoretical amount of hydrogen is observed in 2 hours and 14 minutes at hydrogen pressure between 58.5 and 35.2 p.s.i.g. with a maximum temperature of 41.5° C. The catalyst is filtered and 10 cc. of acetic anhydride is added to the filtrate, whereupon 10.21 g. (67.7% of theory) of white p-acetylaminophenol crystallizes. More product remains in the filtrate which is used as the solvent for a second batch, producing a yield of 84% of white p-acetylaminophenol.

Example 8

A mixture of 20.9 g. of p-nitrophenol, 40 cc. of water, 15 cc. of concentrated hydrochloric acid, and 0.25 g. of 5% palladium on carbon (nitrophenol concentration 26.6%) is hydrogenated at pressure between 58.3 and 29.5 p.s.i.g., reaching a maximum temperature of 44° C. After 4 hours and 56 minutes, the theoretical amount of hydrogen is absorbed. The catalyst is filtered and the filtrate is adjusted to a pH of 6.5 with ammonium hydroxide, producing 13.85 g. (84.5% of theory) of p-aminophenol.

A mixture of 20.9 g. of p-nitrophenol, 40 cc. of water, 15 cc. of concentrated hydrochloric acid, and the catalyst filtered off above, is hydrogenated in the manner described above. After filtration of the catalyst, 0.1 g. of sodium hydrosulfite is added and the filtrate is adjusted to a pH of 6.3 with ammonium hydroxide. To this is added 15 cc. of acetic anhydride, whereupon p-acetylaminophenol crystallizes in an amount of 19.83 g. (87.8% of theory), as white crystals of high purity.

Example 9

A mixture of 13.9 g. of m-nitrophenol, 40 cc. of water, 10 cc. of concentrated hydrochloric acid (1.1 molar equivalents), and 0.25 g. of 5% palladium on carbon, is hydrogenated in a Parr flask at a pressure varying between 57.5 and 34 p.s.i.g. with a maximum temperature of 37.5° C. The m-nitrophenol concentration of the reaction mixture is 19.4%. Hydrogen uptake in 2 hours and 12 minutes is theoretical. The catalyst is filtered, leaving a colorless solution which is neutralized to a pH of 6.5 with ammonium hydroxide. White, starlike crystals appear which are filtered and dried at 65° C. A yield of 7.4 g. or 68.8% of m-aminophenol is obtained, with more of the product remaining in solution. The product has a melting point of 121–3° C. without recrystallization and titrates to a purity of 100%.

*Example 10*

A mixture of 13.9 g. of o-nitrophenol, 40 cc. of water, 10 cc. of hydrochloric acid (1.1 molar equivalents), and 0.25 g. of 5% palladium on carbon (nitrophenol concentration is 19.4%) is hydrogenated at a hydrogen pressure varying between 57 and 33 p.s.i.g., reaching a maximum temperature of 58° C. After 3 hours and 39 minutes, the theoretical amount of hydrogen is absorbed. The catalyst is filtered off and the filtrate is divided in two equal parts.

(a) One half of the filtrate is neutralized with ammonium hydroxide to a pH of 6.2, whereupon a silver-gray powder can be separated by filtration. This represents 5.04 g. or 92.5% of o-aminophenol. It decomposes at 173° C.

(b) To the remaining portions of the filtrate, ammonium hydroxide is added to a pH of 6.2 followed by the addition of 5 cc. of acetic anhydride. The initial precipitate of o-aminophenol dissolves and reprecipitates as 5.57 g. or 73.8% of pure, white o-acetylaminophenol. More of the product remains in the filtrate which can be used as solvent for subsequent hydrogenations.

In the above examples, the operability of the normal process has been demonstrated in a number of variations. Among the variables are temperature, pressure, catalyst ratio, type of catalyst, concentration of catalyst, acid concentration, and concentration of starting material in the reaction mixture.

The hydrogenation reaction of the present invention is exothermic as mentioned above. Therefore, it is very convenient to start this reaction at room temperature and use the exothermicity of the reaction to warm the mixture to the desired reaction temperature, in other words, no external heat is required. The reaction is smooth and gentle but external cooling is necessary when operating in large batches or at high concentrations. If desired, however, the reaction mixture can be preheated to obtain a greater overall hydrogenation speed. This may, for instance, be desirable if a catalyst has been reused a great many times and appears to have lost some of its original activity.

For convenience, the present process is run at low pressure, say between 15 and 60 p.s.i.g. of hydrogen pressure. The upper pressure limitation is dictated by the equipment where low-pressure equipment is used and is not a limitation of the process, since higher pressures may be used but to no significant advantage in small-batch operations. Essentially, this reaction proceeds under any partial hydrogen pressure. If this new process is used in a continuous operation, to which it can easily be adapted, somewhat higher pressures may be desirable.

The catalysts useful for the hydrogenation of the new process are platinum, palladium, or their respective oxides. Where the oxides are used, these are reduced first before hydrogenation of the nitrophenol begins, which, obviously will not be necessary if this same catalyst is reused in a subsequent reaction. A metallic content of catalyst of 0.01% to 2.0% is the preferred ratio as based on the amount of starting material. Higher catalyst amounts may be used but to no added advantage, but at lower catalyst ratios the hydrogenation becomes commercially uneconomical due to slow hydrogenation speeds. As mentioned above, the catalyst is usually used in combination with a suitable carrier. Any of the commonly used carriers that does not interfere with the components in the reaction mixture can be used. One of the most suitable carriers is carbon but other carriers such as silica gel, alumina, asbestos, etc. are also operable.

As pointed out in the examples, the most important ingredient in the reaction mixture is an acid selected from the group of acetic acid and inert mineral acids. The term "inert" is used to express that such acid does not react with other ingredients of the reaction mixture. Obviously, mineral acids containing known noble metal catalyst poisons like arsenic acid are excluded by this term. On the other hand, hydrochloric, sulfuric, nitric, phosphoric acid and the like may be used and are preferred, where the corresponding salts are the desired end products. Where the free aminophenols are to be prepared, mineral acids are as suitable as acetic acid; however, when acetylaminophenols are the desired end products, acetic acid is preferred. This preference stems from the fact that the filtrate obtained after removing acetylaminophenol can be reused as a solvent for a subsequent reaction to dissolve additional nitrophenol. The amount of acid necessary in an initial reaction mixture is at least one molar equivalent of the amount of nitrophenol. Where acetic acid is used, a large excess over one molar equivalent is acceptable, although obviously not economical. Furthermore, where acetylaminophenol is made, the acid concentration of the final filtrate increases since acetic acid forms as a by-product in the acetylation reaction. Where a mineral acid is used initially, a minimum amount thereof is recommended where it is known that the acid addition salt with aminophenol is only difficultly soluble in the reaction medium.

The reaction mixture also contains water. The amount of water is so selected that a minimum of 10% nitrophenol is present in the reaction mixture. Larger amounts only tend to decrease the conversion rate per volume.

From the foregoing it will be seen that one of the advantages of the present process is its operability in high concentrations. Economical concentrations based upon the total of the starting mixture are above 10% nitrophenol content but concentrations up to about 40% are operable. Excellent results are obtained by starting with a reaction mixture that contains between 15% and 30% nitrophenol and such a concentration is easily obtained by mixing the nitrophenol, at least one molar equivalent of acid, and water to make up the desired concentration. The reaction mixture may also contain additional charcoal, filter aids, or other inert and additives that are frequently used in this type of reaction.

The operability of the present process at high concentrations of starting material is in striking contrast to earlier methods wherein water is the only reaction medium, necessitating large volumes to insure keeping the formed reaction product in solution to enable filtration of the catalyst. An additional advantage over the use of the water alone as a reaction medium is the fact that for the manufacture of acetylaminophenol, the aminophenol does not have to be isolated, as demonstrated in the examples above. Another great advantage of the present process is the fact that aminophenols or acetylaminophenols are obtained in excellent yields and qualities, suitable for pharmaceutical end uses. Particularly, the end-products are obtained without discoloration and no special precautions to avoid oxidation, i.e. flushing with nitrogen gas, are required. The aminophenols are used as starting materials for a large number of pharmaceutical end-products, e.g. p-acetylaminophenol which is a known analgesic and antipyretic.

Others may practice the invention in any of the numerous ways which will be suggested to one skilled in the art by the present disclosure. All such practice of the invention is considered to be a part hereof provided it falls within the scope of the appended claims.

We claim:
1. The method of hydrogenating nitrophenol comprising the steps of mixing nitrophenol, a catalyst selected from the group consisting of platinum, palladium, and the corresponding oxides, at least one molar equivalent of an acid selected from the group consisting of inert, mineral acids and acetic acid, and water to make up a reaction mixture containing at least 10% nitrophenol; and hydrogenating said mixture at a pressure below 100 p.s.i. with gaseous hydrogen until 3 moles of hydrogen are absorbed.
2. The method of claim 1 wherein said hydrogenation is initiated at room temperature.
3. The method of claim 1 wherein said hydrogen pressure is between 20 and 65 p.s.i.g.
4. The method of claim 1 wherein said catalyst is precipitated on an inert carrier.
5. The method of claim 4 wherein said catalyst is palladium on charcoal.
6. The method of making p-aminophenol comprising the steps of mixing p-nitrophenol, a catalyst selected from the group consisting of platinum, palladium, and the corresponding oxides, at least one molar equivalent of acetic acid, and water to make up a reaction mixture containing at least 10% p-nitrophenol; hydrogenating said mixture at a pressure below 100 p.s.i. with gaseous hydrogen until 3 moles of hydrogen are absorbed; removing the catalyst by filtration and neutralizing the filtrate obtained.
7. The method of claim 6 wherein said hydrogen pressure is between 20 and 65 p.s.i.g.
8. The method of making acid addition salts of aminophenol comprising the steps of mixing nitrophenol, a catalyst selected from the group consisting of platinum, palladium and the corresponding oxides, at least one molar equivalent of an inert mineral acid, and water to make up a reaction mixture containing at least 10% nitrophenol; hydrogenating said mixture at a pressure below 100 p.s.i. with gaseous hydrogen until 3 moles of hydrogen are absorbed; removing said catalyst by filtration; and isolating said addition salt between aminophenol and said mineral acid.
9. The method of preparing acetylaminophenol comprising the steps of hydrogenating a mixture comprising nitrophenol, a catalyst selected from the group consisting of platinum, palladium, and the corresponding oxides, at least one molar equivalent of acetic acid, and water to make up a reaction mixture containing at least 10% weight per volume of nitrophenol with gaseous hydrogen at a pressure below 100 p.s.i.g. until 3 moles of hydrogen are absorbed; removing said catalyst by filtration; and adding to the filtrate at least one mole equivalent of acetic anhydride.
10. The method of claim 9 wherein said hydrogenation is initiated at room temperature.
11. The method of claim 9 wherein said hydrogen pressure is between 20 and 65 p.s.i.g.
12. The method of claim 9 wherein said catalyst for said hydrogenation contains 0.01% to 2.0% of a metal selected from the group consisting of platinum and palladium.
13. The method of claim 12 wherein said metal catalyst is supported on a carrier.
14. The method of claim 12 wherein said catalyst is palladium on charcoal.

References Cited in the file of this patent
UNITED STATES PATENTS

| | | |
|---|---|---|
| 2,347,621 | Tindall | Apr. 25, 1944 |
| 2,654,722 | Young et al. | Oct. 6, 1953 |
| 2,799,692 | Croxall et al. | July 16, 1957 |
| 2,823,235 | Graham et al. | Feb. 11, 1958 |
| 2,852,540 | Young et al. | Sept. 16, 1958 |
| 2,921,961 | Muller et al. | Jan. 19, 1960 |
| 2,947,781 | Spiegler et al. | Aug. 2, 1960 |